(12) United States Patent
Moghimi et al.

(10) Patent No.: US 11,196,064 B2
(45) Date of Patent: Dec. 7, 2021

(54) FUEL CELL CONTROLLER, FUEL CELL SYSTEM AND METHOD OF OPERATION

(71) Applicant: Intelligent Energy Limited, Loughborough (GB)

(72) Inventors: Shahin Moghimi, Loughborough (GB); Pratap Rama, Loughborough (GB)

(*) Notice: Subject to any disclaimer, the term of this patent is extended or adjusted under 35 U.S.C. 154(b) by 27 days.

(21) Appl. No.: 16/070,958

(22) PCT Filed: Jan. 17, 2017

(86) PCT No.: PCT/GB2017/050103
§ 371 (c)(1),
(2) Date: Jul. 18, 2018

(87) PCT Pub. No.: WO2017/125722
PCT Pub. Date: Jul. 27, 2017

(65) Prior Publication Data
US 2019/0036138 A1    Jan. 31, 2019

(30) Foreign Application Priority Data

Jan. 19, 2016 (GB) .................................. 1600970

(51) Int. Cl.
*H01M 8/04537* (2016.01)
*H01M 8/04858* (2016.01)
(Continued)

(52) U.S. Cl.
CPC ..... *H01M 8/04552* (2013.01); *H01M 8/0491* (2013.01); *H01M 8/04302* (2016.02);
(Continued)

(58) Field of Classification Search
CPC ......... H01M 8/04552; H01M 8/04302; H01M 8/04559; H01M 8/04753; H01M 8/0491
See application file for complete search history.

(56) References Cited

U.S. PATENT DOCUMENTS

2003/0118876 A1 * 6/2003 Sugiura ............... H01M 8/0494
429/9
2008/0102326 A1   5/2008 Falta
(Continued)

FOREIGN PATENT DOCUMENTS

CN    101682061 A    3/2010
CN    101911361 A    12/2010
(Continued)

OTHER PUBLICATIONS

International Patent Application No. PCT/GB2017/050103; Int'l Search Report and the Written Opinion; dated May 3, 2017; 12 pages.
(Continued)

*Primary Examiner* — Helen Oi K Conley
(74) *Attorney, Agent, or Firm* — BakerHostetler LLP; Mark H. Krietzman

(57) ABSTRACT

A fuel cell controller for controlling the operation of a fuel cell system comprising a plurality of fuel cells arranged together to provide electrical current at an output, the controller configured to actively set an upper limit on the rate of change in current provided by the fuel cell system at the output based on at least one electrical parameter of one or more of the fuel cells such as the lowest voltage ($V_{MCV}$) of an individual fuel cell among a plurality of fuel cells.

15 Claims, 2 Drawing Sheets

(51) Int. Cl.
*H01M 8/04302* (2016.01)
*H01M 8/04746* (2016.01)

(52) U.S. Cl.
CPC ... *H01M 8/04559* (2013.01); *H01M 8/04753* (2013.01); *H01M 2250/20* (2013.01); *Y02T 90/40* (2013.01)

(56) References Cited

U.S. PATENT DOCUMENTS

| | | | |
|---|---|---|---|
| 2008/0187790 A1* | 8/2008 | Kamihara | H01M 8/04559 429/429 |
| 2010/0239930 A1 | 9/2010 | Umayahara et al. | |
| 2011/0076582 A1 | 3/2011 | Zhang et al. | |
| 2013/0288148 A1* | 10/2013 | Kazuno | H01M 8/0488 429/444 |
| 2019/0036138 A1 | 1/2019 | Moghimi et al. | |

FOREIGN PATENT DOCUMENTS

| | | |
|---|---|---|
| CN | 102034995 A | 4/2011 |
| EP | 2355219 A1 | 8/2011 |
| EP | 2763226 A1 | 8/2014 |
| EP | 3021409 A1 | 5/2016 |
| JP | 2006-196432 A | 7/2006 |
| JP | 2009-158383 A | 7/2009 |
| JP | 2010-062032 A | 3/2010 |
| JP | 2015-076247 A | 4/2015 |

OTHER PUBLICATIONS

International Patent Application No. PCT/GB2017/050103; Int'l Preliminary Report on Patentability; dated Aug. 2, 2018; 9 pages.

* cited by examiner

FUEL CELL CONTROLLER, FUEL CELL SYSTEM AND METHOD OF OPERATION

CROSS-REFERENCE TO RELATED APPLICATIONS

This application is the National Stage of International Patent Application No. PCT/GB2017/050103, filed Jan. 17, 2017, which claims priority from Great Britain Patent Application No. 1600970.6, filed Jan. 19, 2016, the disclosures of each of which are incorporated herein by reference in their entireties for any and all purposes.

This invention relates to a fuel cell controller for controlling the operation of a fuel cell system and, in particular, for actively managing power output transients. It also relates to a method of operation of a fuel cell system. The invention also relates to a fuel cell system including said controller.

Conventional electrochemical fuel cells convert fuel and oxidant into electrical energy and a reaction product. A common type of electrochemical fuel cell comprises a membrane electrode assembly (MEA), which includes a polymeric ion (proton) transfer membrane between an anode and a cathode and gas diffusion structures. The fuel, such as hydrogen, and the oxidant, such as oxygen from air, are passed over respective sides of the MEA to generate electrical energy and water as the reaction product. A stack may be formed comprising a number of such fuel cells arranged with separate anode and cathode fluid flow paths. Such a stack is typically in the form of a block comprising numerous individual fuel cell plates held together by end plates at either end of the stack.

It is important that the polymeric ion transfer membrane remains hydrated for efficient operation. It is also important that the temperature of the stack is controlled. Thus, coolant may be supplied to the stack for cooling and/or hydration. The temperature and coolant/hydration fluid availability may affect fuel cell performance. However, fuel cell system performance is also dependant on the quality of the materials of the fuel cell system, any build and assembly imperfections, as well as any degradation that has occurred. Thus, there are multiple issues that may affect operation of a stack. Further, when fuel cells are not performing as expected the electrochemistry that occurs may not be desirable and may cause degradation of surfaces, coatings and/or membranes.

According to a first aspect of the invention, we provide a fuel cell controller for controlling the operation of a fuel cell system comprising a plurality of fuel cells arranged together to provide electrical current at an output, the controller configured to actively determine an upper limit on the rate of change in current provided by the fuel cell system at the output based on at least one electrical parameter of one or more of the fuel cells of the fuel cell system and provide for control of the fuel cell system at least on a change in the electrical current output in accordance with the upper limit.

This is advantageous as control of the electrical current output based on the electrical health of the fuel cell may provide for effective control.

In one or more embodiments, the or each electrical parameter is related, by a predetermined function, to a candidate upper limit on the rate of change in current provided by the fuel cell system at the output, the controller configured to determine the upper limit using the or each candidate upper limit.

In one or more embodiments, the controller is configured to actively set the upper limit based on a plurality of electrical parameters and the controller is configured to determine the upper limit by selection of one of the candidate upper limits as the upper limit based on a predetermined criteria.

In one or more embodiments, the at least one electrical parameter comprise one or more of;
  i) a minimum cell voltage comprising a voltage of a fuel cell of the fuel cell system that has the lowest voltage of the plurality of fuel cells;
  ii) a voltage based on the average voltage of at least two of the plurality fuel cells of the fuel cell system;
  iii) a voltage based on the average voltage of a majority of the plurality fuel cells of the fuel cell system;
  iv) a spread voltage comprising a voltage of a fuel cell of the fuel cell system that has the lowest voltage minus the mean average voltage of the plurality fuel cells of the fuel cell system;
  v) a reverse spread voltage comprising a mean average voltage of the plurality fuel cells of the fuel cell system minus a voltage of a fuel cell of the fuel cell system that has the lowest voltage.

In one or more embodiments, the predetermined criteria comprises the selection of the lower of the candidate upper limits as the upper limit.

In one or more embodiments, the predetermined function is configured to provide positive and negative upper limits and on determination of a negative upper limit the controller is configured to provide for control of the fuel cell system to automatically reduce the power output without exceeding the negative upper limit while on determination of a positive upper limit, the controller is configured to provide for control of the fuel cell system to enforce the upper limit when a change in current output is requested.

In one or more embodiments, the electrical parameter comprises at least;
  a minimum cell voltage comprising a voltage of a fuel cell of the fuel cell system that has the lowest voltage of the plurality of fuel cells; and
  the controller is configured to use a predetermined function to map the minimum cell voltage to a candidate upper limit on the rate of change which is used to determine the upper limit, the predetermined function comprising a first region, below a minimum cell voltage threshold, in which the upper limit on the rate of change in current provided by the fuel cell system at the output is negative and a second region, above the minimum cell voltage threshold, in which the upper limit on the rate of change in current provided by the fuel cell system at the output is positive.

In one or more embodiments, the electrical parameter comprises at least;
  a minimum cell voltage comprising a voltage of a fuel cell of the fuel cell system that has the lowest voltage of the plurality of fuel cells; and
  the controller is configured to use a predetermined function to map the minimum cell voltage to a candidate upper limit on the rate of change which is used to determine the upper limit, the predetermined function comprising a limit increasing region and subsequent limit decreasing region with increasing minimum cell voltage;
  the limit increasing region comprising an increase in the candidate upper limit with increasing minimum cell voltage; and
  the limit decreasing region comprising a decrease in the candidate upper limit with increasing minimum cell voltage.

In one or more embodiments, the electrical parameter comprises at least;

a minimum cell voltage comprising a voltage of a fuel cell of the fuel cell system that has the lowest voltage of the plurality of fuel cells; and the controller is configured to use a predetermined function to map the minimum cell voltage to a candidate upper limit on the rate of change which is used to determine the upper limit, the predetermined function comprising a maximum permitted upper limit $L_{max}$ that is provided as the candidate upper limit between a second minimum cell voltage threshold $V_{MCV2}$ and a third minimum cell voltage threshold $V_{MCV3}$, wherein below the second threshold and above the third threshold, the candidate upper limit is set to a value less than the maximum permitted upper limit.

In one or more embodiments, the electrical parameter comprises at least;

a spread voltage comprising a voltage of a fuel cell of the fuel cell system that has the lowest voltage minus the mean average voltage of the plurality fuel cells of the fuel cell system; and the controller is configured to use a predetermined function to map the minimum cell voltage to a candidate upper limit on the rate of change which is used to determine the upper limit, the predetermined function comprising a first region, below a spread voltage threshold, in which the upper limit on the rate of change in current provided by the fuel cell system at the output is negative and a second region, above the spread voltage threshold, in which the upper limit on the rate of change in current provided by the fuel cell system at the output is positive.

In one or more embodiments, the controller is configured to monitor changes in the electrical output of the fuel cell system and, in response to the rate of change in the current provided at the output approaching within a predetermined amount or reaching or exceeding the upper limit, control the fuel cell system to reduce the rate of change in current provided by the fuel cell system at the output.

In one or more embodiments, the controller is configured to receive a power order comprising a desired power output at the output, the controller further configured to control the fuel cell system to provide the electrical current at the output in accordance with the power order such that the rate of change in current output does not exceed the upper limit.

In one or more embodiments, the controller includes a user interface to receive power orders from a user.

In one or more embodiments, the controller is configured to receive a restorative power order in the event one or more electrical parameter operating limits are exceeded, and the controller is further configured to control the fuel cell system to provide the electrical current at the output in accordance with the restorative power order such that the rate of change in current output does not exceed the upper limit.

According to a further aspect of the invention we provide a fuel cell system comprising a plurality of fuel cells arranged together to provide an electrical current at an output, and a controller according to any preceding claim configured to control the fuel cell system to provide an upper limit on the rate of changes in the electrical current provided at the output.

According to a further aspect of the invention we provide a method of controlling the operation of a fuel cell system comprising a plurality of fuel cells arranged together to provide electrical current at an output, the method comprising;

actively determining an upper limit on the rate of change in current provided by the fuel cell system at the output based on at least one electrical parameter of one or more of the fuel cells of the fuel cell system.

According to a further aspect of the invention we provide a computer program or a computer program product having instructions thereon that, when executed on a processor, cause the processor to provide control signals to;

actively setting an upper limit on the rate of change in current provided by the fuel cell system at the output based on at least one electrical parameter of one or more of the fuel cells of the fuel cell system; and providing for control of the fuel cell system at least on a change in the electrical current output of the fuel cell system in accordance with the upper limit.

There now follows, by way of example only, a detailed description of embodiments of the invention with reference to the following figures, in which.

Figure 1:
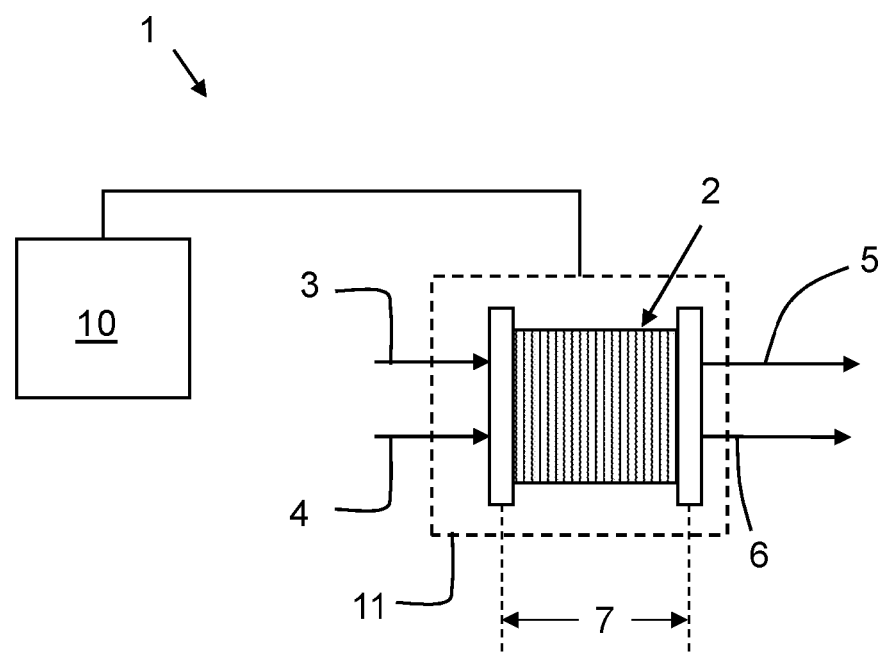
FIG. 1 shows a schematic diagram of a fuel cell system.

The figures show a fuel cell system 1 comprising a fuel cell assembly which, in this example comprises a fuel cell stack including a plurality of proton exchange membrane fuel cells 2 stacked together. The fuel cell assembly, in this example, comprises an evaporatively cooled fuel cell assembly. The fuel cells 2 of the assembly are configured to receive a flow of fuel, such as hydrogen, through an anode inlet 3 and a flow of oxidant, such as air, through a cathode inlet 4. An anode exhaust 5 is provided to allow for through flow of the fuel. A cathode exhaust 6 is provided to allow for through flow of the oxidant. An electrical output of the fuel cell assembly is shown schematically at 7. It will be appreciated that while in this example a fuel cell stack is shown, the controller is also applicable to planar fuel cell arrangements or any other fuel cell arrangements.

A fuel cell controller 10 is provided for controlling operation of the fuel cell system. The controller 10 may also receive one or more measures of the performance of the fuel cell assembly 2 by way of one or more sensors 11 (shown schematically), such as electrical sensors. The sensor(s) may comprise electrical property measurement sensors, such as a voltmeter and/or ammeter for measuring the voltage across and/or current from one or more of the fuel cells or groups of cells. The sensors(s) may additionally include temperature sensors, oxidant/fuel flow rate sensors, oxidant/fuel temperature sensors, oxidant/fuel pump/compressor duty sensors or others.

The fuel cell controller 10 is configured to use the live measurements from the sensors to actively control the fuel cell system 1. Control may be exerted by way of controlling the electrical output, controlling the fuel and/or oxidant flow rates or by another method capable of affecting the sensor measurements. Thus, the controller 10 may perform closed loop feedback control of the fuel cell system 1.

Figure 2:
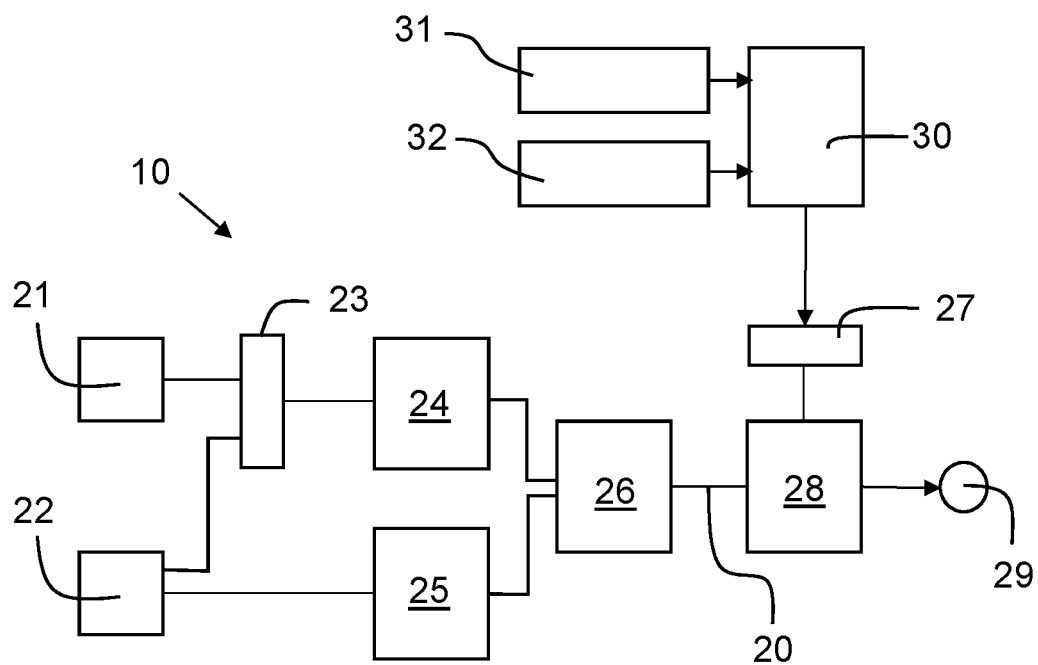
FIG. 2 shows a schematic diagram of an example fuel cell controller.

FIG. 2 shows a schematic view of the controller 10. The controller 10 is configured to actively determine an upper limit 20 on the rate of change in current provided by the fuel cell system 1 at the output 7 based on at least one electrical parameter of one or more of the fuel cells 2 of the fuel cell system. In this example two electrical parameters are used to determine the upper limit 20; a first electrical parameter and a second electrical parameter.

The controller 10 is configured to receive at 21 a live measure of the mean cell voltage of the plurality of fuel cells 2 that form the fuel cell system. The live measure may comprise an average and/or filtered measure, such as comprising a moving average over a time window. It will be appreciated that the controller may receive a plurality of voltage measurements from each of the fuel cells and determine the mean average itself.

Further, the controller 10 is configured to receive at 22 a live measure of a minimum cell voltage comprising a voltage of a fuel cell 2 of the fuel cell system 1 that has the lowest voltage of the plurality of fuel cells 2. The live measure may comprise an average and/or filtered measure, such as comprising a moving average over a time window. It will be appreciated that the controller may receive a plurality of voltage measurements from each of the fuel cells and determine the minimum cell voltage itself.

In this embodiment, the controller is configured to use the mean fuel cell voltage and the minimum cell voltage to calculate mean cell voltage minus minimum cell voltage at 23. In other examples, a different element may provide the controller with the live "minimum-mean" value. For ease of reference, the calculated mean cell voltage minus minimum cell voltage will be referred to as the spread voltage.

The use of one or both of these two electrical parameters has been found to be particularly indicative of fuel cell system health and therefore have been found to be effective at controlling fuel cell system current transients. While in this embodiment two electrical parameters are used to determine the upper limit, in other examples, different or more or fewer electrical parameters could be used.

Each electrical parameter is related to, by the controller using a predetermined function 24, 25, a candidate upper limit on the rate of change in current provided by the fuel cell system at the output. The predetermined functions 24, 25 will be discussed in more detail below with reference to FIGS. 4 and 5.

The controller 10 is configured to actively set the upper limit based on the output of the predetermined functions 24, 25 at 26. The controller is configured to determine the upper limit 20 by selection of one of the candidate upper limits based on a predetermined criteria. In this example, the predetermined criteria comprises the selection of the lower of the candidate upper limits obtained from 24, 25 as the ultimate, upper limit.

While in this example, the predetermined criteria comprises selecting the lower of the upper limits from 24, 25, the predetermined criteria may comprise selecting a higher of the candidate upper limits or selecting one of the candidate upper limits based on an electrical parameter or other sensor measurement. For example, in cold conditions it may be preferable to make the selection one way and in warmer conditions in a different way and therefore selection may be based on temperature.

Further, while the controller 10, in this example, is configured to select one of the candidate upper limits as the ultimate, upper limit, the controller may use a function to combine the candidate upper limits to form the upper limit. For example, the function may comprise taking an average of the candidate upper limits or may use a historic upper limit in combination with the candidate upper limits.

In this example, the controller 10 is shown to receive a power order or current set point 27. The controller 10 then uses the current set point 27, the present current output at output 7 and the upper limit 20 to control the fuel cell system, shown at 28. Control of the fuel cell system, in this example, comprises outputting a control signal 29 that causes the fuel cell system to move towards the current set point without exceeding the upper limit on the rate of change in the current output. Thus, the control signal 29 may comprise a plurality of intermediate power orders between the present current output and the current set point for providing over a period of time that does not infringe on the upper limit. This ensures current transients are effectively managed.

The controller may include a user interface to receive the power order 27 derived from a user input. If the fuel cell system forms part of a vehicle, the user interface may form part of the vehicle's controls.

In this example, the current set point 27 is shown received from a second controller 30. The second controller may determine the current set point based on different parameters to the controller 10. In one or more examples, the controller 10 may provide for control based (solely or primarily for example) on electrical parameters of the fuel cell 2 while the second controller may provide for control based on measurement of the fluids that are provided through the fuel cell 2. The second controller 30 is configured to receive a power order or current set point at 31. This current set point may be user defined or defined by a still further controller. The second controller 30 further receives sensor data at 32 comprising at least the amount and/or flow rate and/or temperature of one or more fluids provided to the fuel cell stack 2. The fluids may include the fuel flow, the oxidant flow and/or hydration fluid or coolant fluid. Thus, the second controller 30 is configured to determine a current set point 27 based on the sensor data 32 and the requested current set point at 31 upon which the controller 10 operates. It will be appreciated that in other embodiments the second controller may be integrated with the controller 10 in an alternative manner.

Figure 3:
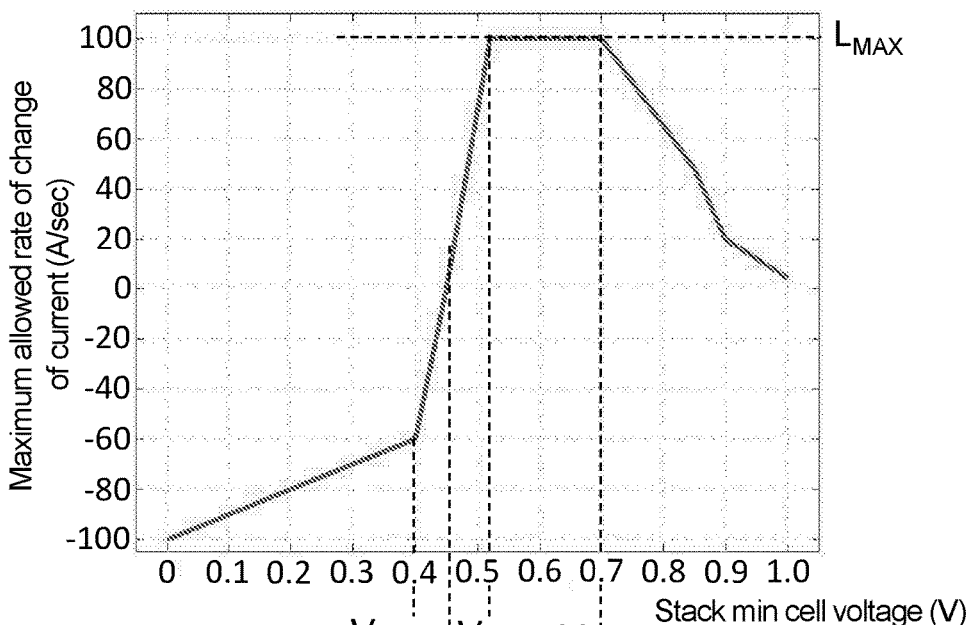
FIG. 3 shows a first example control map applied by the fuel cell controller.

FIG. 3 shows the predetermined function 40 that is used by the controller 10 at step 24 to map the measured minimum cell voltage to a candidate upper limit on the rate of change in current.

The predetermined function 40 shows that below a first, minimum cell voltage, threshold $V_{MCV1}$ the controller is configured to set an upper limit on the rate of change in current at output 7 that is negative. Further the predetermined function shows that above the first minimum cell voltage threshold $V_{MCV1}$, the controller is configured to set an upper limit on the rate of change in current at output 7 that is positive. In this example, the first threshold $V_{MCV1}$ is substantially 0.45V.

The predetermined function may further comprises a maximum permitted upper limit $L_{max}$ that is provided between a second minimum cell voltage threshold $V_{MCV2}$ and a third minimum cell voltage threshold $V_{MCV3}$, wherein below the second threshold and above the third threshold, the upper limit is set to a value less than the maximum permitted upper limit. In this example the maximum permitted upper limit $L_{max}$ is substantially 100 A/second, although it may be between 50 and 150 for example. Thus, if the minimum cell voltage is between 0.52 and 0.7V the fuel cell system is believed to be within a healthy operating window and high positive current request transients can be requested from it.

The second minimum cell voltage threshold $V_{MCV2}$ is related to the electrochemistry of the cell. The second threshold may be greater than the first threshold. The third minimum cell voltage threshold is greater than the second threshold. At the first threshold, the upper limit is set to 0 A/sec. Thus, between the first and second thresholds, the controller is configured to provide an increasing upper limit with increasing minimum voltage (i.e. a limit increasing region). Thus, if the minimum cell voltage is within the region between 0.52 to 0.45 V the controller proportionally limits the positive transient rate since it deduces that the stack is underperforming and very high power transients should not be requested from it. Above the third threshold, the controller may be configured to provide a decreasing upper limit with increasing minimum voltage (i.e. a limit decreasing region). This limit decreasing region is advantageous as the controller progressively limits the current transients because at high minimum cell voltages the health of the stack has been found to be less certain. In particular, at very high minimum cell voltage values (i.e. above the third minimum cell voltage threshold such as about 0.8V) maximum positive transients should not be requested from stack. This provides open circuit voltage protection. This is because at those conditions stack is at or near its open circuit voltage and not providing a considerable amount of current, and therefore its health and operation capability may not be clearly known.

The predetermined function may further include a fourth threshold $V_{MCV4}$, lower than a minimum voltage related to the electrochemistry of the cell. The fourth threshold $V_{MCV4}$ is less than the first threshold $V_{MCV1}$ and;
  i) Between the fourth threshold and the first threshold, the upper limit increases with measured minimum cell voltage at a first rate;
  ii) Below the fourth threshold, the upper limit increases with measured minimum cell voltage at a second rate, different to (and may be lower than) the first rate.

The fourth minimum cell voltage threshold $V_{MCV4}$ may be substantially 0.4 V.

It will be appreciated that any combination or subset of the first to fourth thresholds may be provided.

Figure 4:
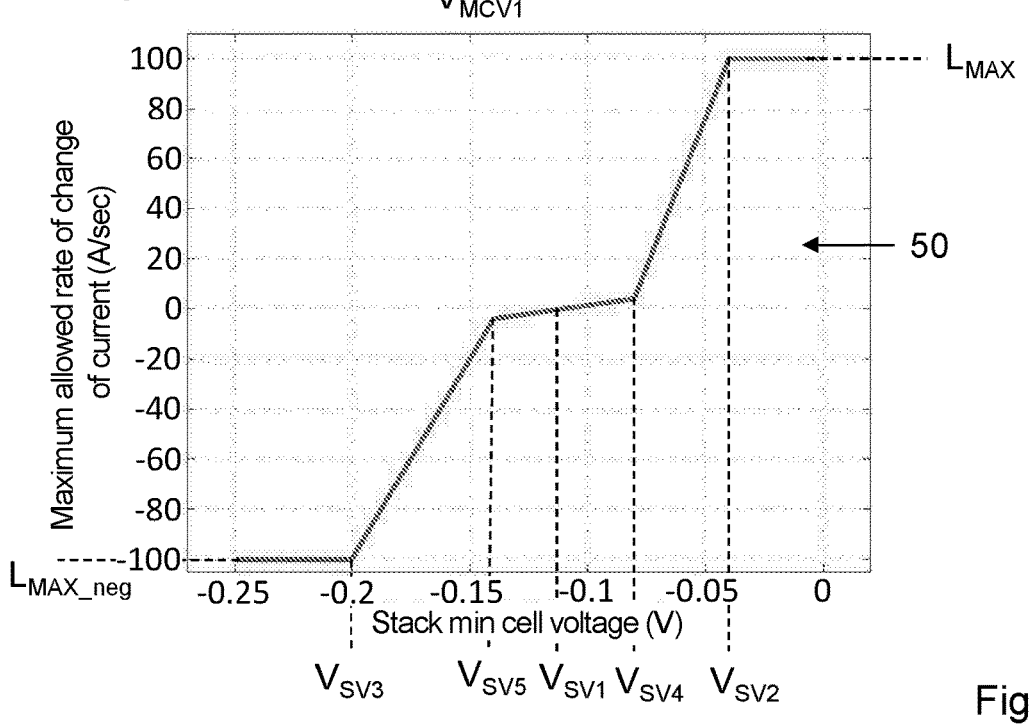
FIG. 4 shows a second example control map applied by the fuel cell controller.

FIG. 4 shows the predetermined function 50 that is used by the controller 10 at step 25 to map the measured spread voltage to a candidate upper limit on the rate of change.

The predetermined function includes a first spread voltage threshold $V_{SV1}$, below which the controller is configured to set an upper limit on the rate of change in current at output 7 that is negative. Further, above the first spread voltage threshold $V_{SV1}$, the controller is configured to set an upper limit on the rate of change in current at output 7 that is positive. In this example, the first spread threshold $V_{SV1}$ is substantially −0.11V.

The predetermined function 50 may further comprises a maximum permitted upper limit $L_{max}$ that is provided when the spread voltage is above a second spread voltage threshold $V_{SV2}$. Below the second spread voltage threshold the upper limit is set to a value less than the maximum permitted upper limit. In this example the maximum permitted upper limit $L_{max}$ is substantially 100 A/second. The second spread voltage threshold is substantially −0.04 V.

The predetermined function 50 may further comprises a maximum permitted negative upper limit $L_{max\_neg}$ that is provided when the spread voltage is below a third spread voltage threshold $V_{SV3}$. Above the third spread voltage threshold the upper limit is set to a value less in magnitude than the maximum permitted negative upper limit. In this example the maximum permitted negative upper limit $L_{max}$ is substantially −100 A/second and the third spread voltage threshold $V_{SV3}$ is substantially −0.2 V.

The predetermined function 50 may include a fourth spread voltage threshold $V_{SV4}$, greater than the first spread voltage threshold wherein;
  i) Above the fourth spread voltage threshold, the upper limit increases with spread voltage at a first rate;
  ii) Below the fourth spread voltage threshold, the upper limit increases with spread voltage at a second rate, different to (and may be lower than) the first rate.

The fourth spread voltage threshold $V_{SV4}$ may be substantially −0.075 V.

The predetermined function 50 may include a fifth spread voltage threshold $V_{SV5}$, less than the first spread voltage threshold wherein;
  i) Above the fifth spread voltage threshold, the upper limit is negative and increases with spread voltage at a first rate;
  ii) Below the fifth spread threshold, the upper limit is negative and increases with spread voltage at a second rate, different to (and may be greater than) the first rate.

The fifth spread voltage threshold $V_{SV4}$ may be substantially −0.14 V.

It will be appreciated that any combination or subset of the first to fifth spread voltage thresholds may be provided.

Careful choice of the upper limit around the first minimum cell voltage threshold (i.e. the zero maximum allowed rate of change point) is important to eliminate any oscillations in power while the fuel cell system is operating in that region. Optionally, the predetermined function may be configured to apply higher negative rates than positive rates on either side of the zero current transient point.

Thus, returning to FIG. 2, the controller 10 may enforce the upper limit by providing for control of the fuel cell system to prevent the upper limit being exceeded. The controller may actively control the current output to meet power orders in accordance with the upper limit. Alternatively, it may not receive power orders and may instead act to intervene if the rate of change in current is exceeding the upper limit determined at 26. Further, while the upper limit discussed above is defined as a limit on how quickly the current output is allowed change, it may also be used to determine the rate at which the current output should change. Thus, on receiving a power order, the controller may control the fuel cell system so that the current output changes at the determined upper limit.

Therefore, in the example of FIG. 2, the controller is configured to receive a power order and control the fuel cell system 1 to provide the electrical current at the output 7 in accordance with the power order such that the rate of change in current output does not exceed the upper limit. However, in a further example, the controller 10 may be configured to monitor changes in the electrical output at 7 and, in response to the rate of change in the current provided at the output approaching within a predetermined amount or reaching or exceeding the upper limit calculated at 28, control the fuel cell system 1 to reduce the rate of change in current provided by the fuel cell system at the output.

The controller 10 may be configured to receive a restorative power order in the event one or more electrical parameter operating limits are exceeded, and the controller may be further configured to control the fuel cell system 1 to provide the electrical current at the output 7 in accordance with the restorative power order such that the rate of change in current output does not exceed the upper limit. The electrical parameter operating limits may be defined in terms of the minimum individual fuel cell voltage or the spread voltage. Therefore, the controller 10 may form part of a larger controller that ensures certain electrical parameters (not necessary the same or different to the electrical parameters used by the controller 10) do not exceed predetermined operating limits. Accordingly, the restorative power orders may, in general, request a reduction in the current output at output 7 and the controller 10 may control the fuel cell system to make the transition to the request power order without exceeding the negative upper limits enforced when one or both of the predetermined functions provide for a negative upper limit.

In this example, issue of the restorative power orders are coordinated with determination of an upper limit that is negative at 26. Thus, when the controller 10 determines the upper limit on the transient current and that determined upper limit is negative, as determined by the predetermined function(s), the controller is configured to react to reduce the power output in accordance with a restorative power order and move from the present current output to the current output determined by the restorative power order without exceeding the negative upper limit.

In general, the determination of positive and negative upper limits using the predetermined function(s) provides a convenient way for the controller to ensure the fuel cell system is operating correctly. Thus, on determination of a negative upper limit the controller may automatically reduce the power output without exceeding the negative upper limit while on determination of a positive upper limit, the controller may act to enforce the upper limit when a change in current output is requested.

Figure 5:
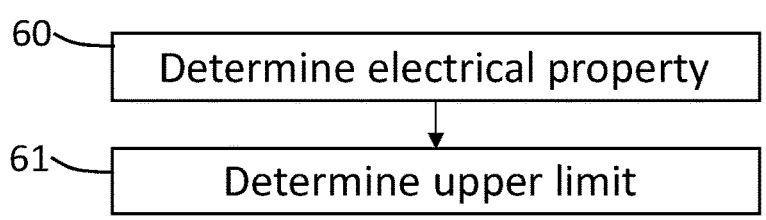
FIG. 5 shows a flowchart illustrating an example method.

FIG. 5 shows a flow chart illustrating operation of the controller 10. Step 60 comprises determining at least one electrical parameter of one or more of the fuel cells of the fuel cell system. Step 61 comprises actively setting an upper limit on the rate of change in current provided by the fuel cell system at the output based on the at least one electrical parameter of one or more of the fuel cells of the fuel cell system.

Figure 6:
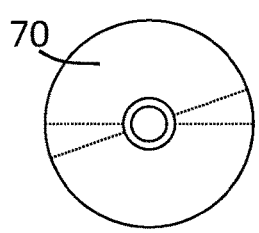
FIG. 6 shows a computer readable medium including computer program code for implementing an example method.

FIG. 6 shows a computer readable medium in the form of a compact disc 70 comprises computer program code that, when executed on a processor and memory that may form part of the controller 10, performs the method of FIG. 5 and/or provides for the functions of the controller 10, as described above.

The controller 10 is advantageous as it can, using the electrical parameters, make an assessment of the health of the fuel cell system and control how changes in current are provided by the fuel cell system. Further, the controller can be incorporated with other controllers that ensure the fuel cell system is operating with a predefined operating envelope (using electrical parameter operating limits) while the controller 10 controls the output of the fuel cell system within and outside that operating envelope. The controller is also advantageous during cold start-up where one or more fluids relied upon by the fuel cell system, such as hydration or cooling fluid may be frozen. In such conditions, due to the cold system condition and its dry operation due to lack of available hydration fluid, the electrical behaviour of the system may significantly deviate from expected behaviour. The controller is able to use the one or more electrical parameters to determine an upper limit on current output transients, which is advantageous is such conditions.

While FIGS. 3 and 4 illustrate the predetermined functions as a graphical map, the term 'predetermined function' includes a calculation or other algorithm that determines how each said measured parameter translates into health and capability of the stack and consequently what upper limit on the current transient rate is appropriate.

The controller 10 may be configured to operate alongside or integrated with a reactant fluid flow based controller, such as second controller 30. The reactant fluid flow controller uses measures of the reactant flows to control the electrical output while the present controller uses the electrical parameters to control the rate at which the output current changes.

The invention claimed is:

1. A fuel cell controller for controlling the operation of a fuel cell system comprising a plurality of fuel cells arranged together to provide electrical current at an output, the controller being configured to:
   actively determine, based on (i) voltage of a fuel cell of the fuel cell system that has a lowest voltage from among the plurality of fuel cells and (ii) a predetermined function, a maximum limit on a rate of change in current provided by the fuel cell system at the output; and
   control the fuel cell system based at least in part on a change in the electrical current output in accordance with the maximum limit,
   in which the predetermined function causes (i) a first region, below a minimum cell voltage threshold, in which the maximum limit on the rate of change in current provided by the fuel cell system at the output is negative and (ii) a second region, above the minimum cell voltage threshold, in which the maximum limit on the rate of change in current provided by the fuel cell system at the output is positive.

2. A fuel cell controller according to claim 1, in which at least one electrical parameter comprises a reverse spread voltage comprising a mean voltage of the plurality fuel cells of the fuel cell system minus the voltage of the fuel cell of the fuel cell system that has the lowest voltage.

3. A fuel cell controller according to claim 2, in which the controller is configured to actively set the maximum limit based on a plurality of electrical parameters and the controller is configured to determine the maximum limit by selection of one candidate upper limit as the maximum limit based on a set of predetermined criteria.

4. A fuel cell controller according to claim 3, in which the set of predetermined criteria comprises a selection of a lowest candidate upper limit as the maximum limit.

5. A fuel cell controller according to claim 1, in which the predetermined function is configured to provide positive and negative upper limits and on determination of a negative upper limit the controller is configured to provide for control of the fuel cell system to automatically reduce the power output without exceeding the negative upper limit while on determination of a positive upper limit, the controller is configured to provide for control of the fuel cell system to enforce the maximum limit when a change in current output is requested.

6. A fuel cell controller according to claim 1, in which the controller is configured to use a predetermined function to map the lowest fuel cell voltage to a candidate upper limit on the rate of change which is used to determine the maximum limit, the predetermined function causing (i) a limit increasing region and (ii) subsequent limit decreasing region with increasing minimum cell voltage;
   in which the limit increasing region comprises an increase in the candidate upper limit with increasing minimum cell voltage; and
   in which the limit decreasing region comprises a decrease in the candidate upper limit with increasing minimum cell voltage.

7. A fuel cell controller according to claim 1, in which the controller is configured to use a predetermined function to map the lowest fuel cell voltage to a candidate upper limit on the rate of change which is used to determine the maximum limit, the predetermined function comprising a maximum permitted upper limit $L_{max}$ that is provided as the candidate upper limit between a second minimum cell voltage threshold $V_{MCV2}$ and a third minimum cell voltage threshold $V_{MCV3}$, wherein below the second threshold and above the third threshold, the candidate upper limit is set to a value less than the maximum permitted upper limit.

8. A fuel cell controller according to claim 1, in which the controller is configured to use a predetermined function to map the lowest fuel cell voltage to a candidate upper limit on the rate of change which is used to determine the maximum limit, the predetermined function causing (i) a first region, below a spread voltage threshold, in which the maximum limit on the rate of change in current provided by the fuel cell system at the output is negative and cii) a second region, above the spread voltage threshold, in which the maximum limit on the rate of change in current provided by the fuel cell system at the output is positive.

9. A fuel cell controller according to claim 1, in which the controller is configured to monitor changes in the electrical output of the fuel cell system and, in response to the rate of change in the current provided at the output approaching within a predetermined amount or reaching or exceeding the maximum limit, control the fuel cell system to reduce the rate of change in current provided by the fuel cell system at the output.

10. A fuel cell controller according to claim 1, in which the controller is configured to receive a power order comprising a desired power output at the output, the controller further configured to control the fuel cell system to provide the electrical current at the output in accordance with the power order such that the rate of change in current output does not exceed the maximum limit.

11. A fuel cell controller according to claim 10, in which the controller includes a user interface to receive power orders from a user.

12. A fuel cell controller according to claim 10, in which the controller is configured to receive a restorative power order in the event one or more electrical parameter operating limits are exceeded, and the controller is further configured to control the fuel cell system to provide the electrical current at the output in accordance with the restorative power order such that the rate of change in current output does not exceed the maximum limit.

13. A fuel cell system comprising a plurality of fuel cells arranged together to provide an electrical current at an output, and a controller according to claim 1 configured to control the fuel cell system to provide a maximum limit on the rate of changes in the electrical current provided at the output.

14. A method of controlling the operation of a fuel cell system comprising a plurality of fuel cells arranged together to provide electrical current at an output, the method comprising;
   actively determining, based on (i) a voltage of a fuel cell of the fuel cell system that has a lowest voltage from among the plurality of fuel cells and (ii) a predetermined function, a maximum limit on a rate of change in current provided by the fuel cell system at the output; and
   controlling the fuel cell system based at least in part on a change in the electrical current output in accordance with the maximum limit,
   in which the predetermined function causes (i) a first region, below a minimum cell voltage threshold, in which the maximum limit on the rate of change in current provided by the fuel cell system at the output is negative and (ii) a second region, above the minimum cell voltage threshold, in which the maximum limit on the rate of change in current provided by the fuel cell system at the output is positive.

15. A non-transitory memory having instructions thereon that, when executed on a processor, cause:
   actively setting, based on aa voltage of a fuel cell of the fuel cell system that has a lowest voltage from among the plurality of fuel cells and (ii) a predetermined function, a maximum limit on a rate of change in current provided by a fuel cell system, which comprises a plurality of fuel cells, at an output in which the predetermined function causes (i) a first region, below a minimum cell voltage threshold, in which the maximum limit on the rate of change in current provided by the fuel cell system at the output is negative and (ii) a second region, above the minimum cell voltage threshold, in which the maximum limit on the rate of change in current provided by the fuel cell system at the output is positive; and
   controlling the fuel cell system based at least in part on a change in the electrical current output of the fuel cell system in accordance with the maximum limit.

* * * * *